(12) United States Patent
Knirck et al.

(10) Patent No.: US 6,931,938 B2
(45) Date of Patent: Aug. 23, 2005

(54) MEASURING PRESSURE EXERTED BY A RIGID SURFACE

(76) Inventors: Jeffrey G. Knirck, 868 Jasmine Dr., Sunnyvale, CA (US) 94086; Paul A. Swanson, 19890 Pear Tree La., Cupertino, CA (US) 95014

( * ) Notice: Subject to any disclaimer, the term of this patent is extended or adjusted under 35 U.S.C. 154(b) by 0 days.

(21) Appl. No.: 10/318,596

(22) Filed: Dec. 16, 2002

(65) Prior Publication Data

US 2004/0112138 A1 Jun. 17, 2004

(51) Int. Cl.⁷ .................................................. G01L 9/00
(52) U.S. Cl. ............................................ 73/754; 73/753
(58) Field of Search .................................. 73/700–756

(56) References Cited

U.S. PATENT DOCUMENTS

| | | | |
|---|---|---|---|
| 5,090,246 A | | 2/1992 | Colla et al. |
| 5,184,515 A | * | 2/1993 | Terry et al. ................... 73/727 |
| 5,187,985 A | * | 2/1993 | Nelson ........................ 73/708 |
| 5,311,779 A | | 5/1994 | Teruo |
| 5,896,191 A | | 4/1999 | Beier et al. |
| 5,983,727 A | | 11/1999 | Wellman et al. |
| 6,044,717 A | | 4/2000 | Biegelsen et al. |
| 6,216,545 B1 | | 4/2001 | Taylor |
| 6,247,369 B1 | | 6/2001 | Chapman et al. |
| 6,257,068 B1 | * | 7/2001 | Briefer et al. ................ 73/718 |
| 6,272,936 B1 | | 8/2001 | Oreper et al. |
| 6,432,737 B1 | | 8/2002 | Webster |
| 6,441,503 B1 | | 8/2002 | Webster |

* cited by examiner

*Primary Examiner*—Edward Lefkowitz
*Assistant Examiner*—Jermaine Jenkins

(57) ABSTRACT

A means to accurately measure the pressure distribution across a rigid or semi-rigid surface, or between two rigid or semi-rigid surfaces with high special resolution is disclosed. The present invention relates to measuring a pressure distribution. The present invention would be ideal for use in various types of manufacturing tooling and various in situ industrial machine controls. The present invention uses an array of commercial micro-machined silicon pressure sensing die attached to a substrate and encapsulated in an elastomer.

20 Claims, 1 Drawing Sheet

MEASURING PRESSURE EXERTED BY A RIGID SURFACE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to sensing the pressure or pressure distribution created between two rigid surfaces.

Pressure sensing devices are typically optimized for sensing the pressure of a fluid like a liquid or a gas. In such a case a single measurement will typically suffice because there is no pressure gradient. When two rigid bodies exert a load on each other a Load-cell is traditionally used. A load-cell measures the total force between the two bodies. Load-cells are typically large and not well suited to being used in an array to sense the uniformity of force between two bodies. Small load-cells are approximately one cubic centimeter. Measuring the pressure distribution across a body with millimeter resolution could not be done with commercial load-cells.

Thin, flexible pressure sensitive sheets exist. The few available products all use a piezoresistive material or some other means to sense the distance between two electrodes separated by an elastomer. The piezoresistive technology is particularly appealing for its low cost. Other gap-sensing approaches can be far more precise and accurate but they are also far more costly. There are a few important problems with the basic scheme. Typically there are performance problems associated with sensitivity, linearity, accuracy, hysterisis, aging, and temperature effects.

A good compromise between cost and performance would be to embed an array of commercial micro-machined pressure sensor die in a thin elastomeric sheet. This approach would solve or greatly reduce many of the previous performance problems.

CITED REFERENCES

Oreper et al U.S. Pat. No. 6,272,936 (August 2001) teaches about "A pressure sensor formed of a pair of electrodes with pressure sensitive material therebetween". Oreper is an example of a gap-sensing scheme. Oreper is differentiated from the present invention by its materials and means of assembly, and by its method of operation.

Beier et al U.S. Pat. No. 5,896,191 (April 1999) teaches about "Reinforced Elastomer Panel with Embedded Strain and Pressure Sensors". Beier describes strain and pressure sensors "embedded in an elastomer sheet", in effect describing two inventions. One invention is a panel strain-measuring device. The other invention is a more germane pressure-measuring device. The pressure sensor invention is a plurality of pressure sensors embedded in an elastomer skin. Beier is differentiated from the present invention by its materials and by its intent. The cited pressure sensor type is piezoelectric. Beier describes a device to measure the pressure distribution of air on a panel. The panel incorporates pressure sensors. The pressure sensors are covered with an elastomer skin. "The elastomer skin 40 being flexible transmits the outside air pressure to the pressure sensors 52–56."

The purpose of the elastomeric skin is to protect the pressure sensors but be flexible enough not to affect the pressure reading. The purpose of the present invention is to measure force exerted by a rigid body by using pressure sensors covered by an elastomer to intentionally distribute the applied force over a larger area.

Taylor et al U.S. Pat. No. 6,216,545 (April 2001) teaches about "Piezoresistive Foot Pressure Measurement". Taylor is another example of a gap-sensing scheme. Taylor instructs that, "The piezoresistive mesh layer is sandwiched between an array of row and column conductor strip laminations". Taylor is also differentiated from the present invention by its materials and means of assembly and by its method of operation.

Colla et al U.S. Pat. No. 5,090,246 (February 1992) teaches about "Elastomer Type Low Pressure Sensor". Colla is another example of a gap-sensing scheme. Colla's approach is to sense the gap capacitively. An elastomer is used but it is a "conductive elastomeric layer overlying an elastomeric support layer". Colla is differentiated from the present invention by its materials, means of assembly and by its method of operation.

Terry et al U.S. Pat. No. 5,184,515 (February 1993) teaches about "Single Diaphragm Transducers with Multiple Sensing Elements". Terry does describe more direct pressure sensing instead of a gap-sensing scheme and his purpose is to measure non-uniform pressures produced by "semi-rigid, non-fluid media". Terry describes, "a transducer having a plurality of sensing elements disposed in a single diaphragm". The present invention is similar in construction to Terry in that both are composed of an array silicon based micro-machined diaphragm pressure sensors. The construction described by Terry has a critical fault overcome by the present invention. In the case of the Terry invention, the body to be measured must be flexible enough to deform the diaphragm and produce an electrical signal. A flat rigid body could contact the flat rigid sensing surface of the Terry invention and not produce a measurement. The present invention overcomes this limitation by introducing an elastomeric material between the forcing body and the micro-machined diaphragms of the commercial pressure sensor die.

| Other References Cited | | |
|---|---|---|
| 5,983,727 | December 1999 | Wellman |
| 5,311,779 | May 1994 | Teruo |
| 6,247,369 | June 2001 | Chapman |
| 6,044,717 | April 2000 | Biegelsen |
| 6,432,737 | August 2002 | Webster |
| 6,441,503 | August 2002 | Webster |

SUMMARY OF THE INVENTION

In accordance with the above, this invention provides a means to accurately measure a pressure or a pressure distribution across a rigid or semi-rigid surface with high special resolution.

The present invention accomplishes its objective by using one or more commercial micro-machined silicon pressure sensor die. The dies are then covered with a thin layer of elastomeric material. The use of commercial pressure sensor die provides a precise and accurate measurement and they are very small. The elastomer layer provides a slightly deformable layer over the rigid sensor die. When the sensor array assembly of this invention comes in contact with a rigid body the elastomer is compressed which in turn applies a force on the silicon diaphragm incorporated in the sensor die, thereby producing an electrical signal. This feature of the present invention allows it to be used to measure a wide range of material surface types from fluids to very rigid solids, and everything in between.

The present invention would be ideal for use in various types of manufacturing tooling and various in situ industrial machine controls. Other uses, objects, features and advantages of the present invention will become apparent from the following detailed description when taken in conjunction with the accompanying drawings.

DETAILED DESCRIPTION

Figure 1:
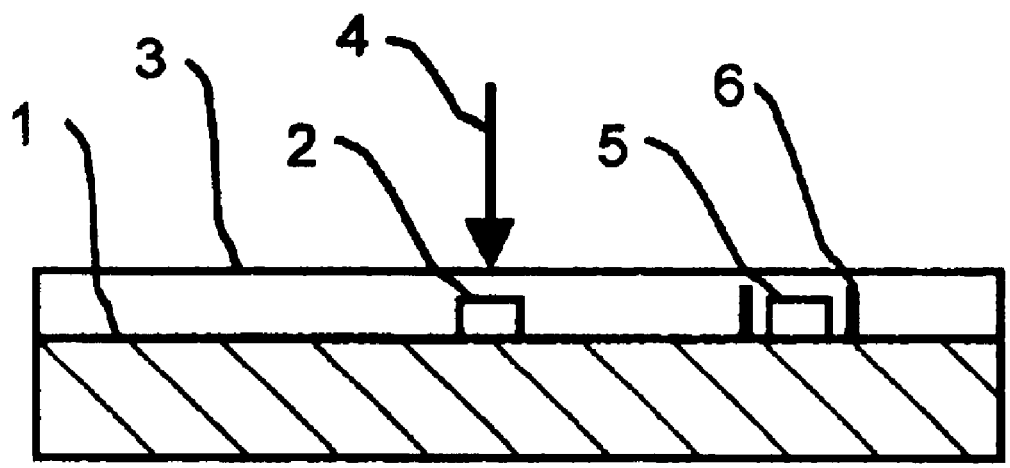
FIG. 1 is a cross-sectional diagram of a sensor assembly.

The present invention provides a means to precisely, simultaneously and accurately measure the pressure distribution produced by a rigid or semi-rigid surface, or between two rigid or semi-rigid surfaces. A semi-rigid body may be soft, pliable, flexible or elastomeric, but it is differentiated from a gas or a liquid since such fluids perfectly conform to their container and won't support a static pressure gradient. The present invention is a pressure sensor apparatus. A multiple pressure sensor apparatus could be arranged in an array or other grouping or collection. The Pressure Sensor is comprised of a commercial silicon micro-machined pressure sensor die embedded in an elastomer. An array may be constructed from individual micro-machined die or multiple pressure sensors in a monolithic micro-machined block. The advantages of the present invention are its precision, accuracy, stability and high spatial resolution.

The details of the present invention can be implemented in numerous variations of configuration materials and components. In any case the basic concept is the same. Various types or brands or pressure ranges of pressure sensors could be used. Various types or thickness of elastomer could be used.

FIG. 1 shows a cross-sectional diagram of the present Pressure Sensor Apparatus invention including two Pressure Sensors, 2 and 5. The array could include as few as one sensor, which would describe a very small load-cell. A large array Pressure Sensor Apparatus could be used to measure a pressure distribution. The Pressure Sensors could be placed relatively close together for high spatial resolution where needed and another area of the same device could be relatively sparsely populated as needed. The Pressure Sensors used in the Pressure Sensor Apparatus will typically be absolute pressure sensing devices. For some special applications the Substrate 1 could be vented or porous to allow for using gauge type pressure sensors.

The Pressure Sensors 2, 5 are securely mounted to a Substrate 1. The Substrate may be a printed circuit board to provide a means to route the electrical signals from the Pressure Sensors to the signal processing electronics. The Substrate may have a significant thickness and rigidity to provide a reference body that the body to be measured can push against. Alternatively the Substrate may be very thin and elastomeric to allow the Pressure Sensor Apparatus to conform to some other reference surface allowing the Pressure Sensor Apparatus to measure the pressure distribution created by a body to be measured pushing against a reference surface or a second body, with the Pressure Sensor Apparatus in between.

In the present invention the Pressure Sensors 2, 5 are covered or encapsulated with an Elastomer 3. This feature provides a means for the forcing body to transfer force to the sensing element of the Pressure Sensor, while the applied force is spread over an area at least as large as the pressure sensor. To uniformly spread the force there should be a relatively constant thickness of elastomer on each pressure sensor. The constant thickness of elastomer can be formed by potting or encapsulating, or by applying a uniform thickness sheet of elastomeric material. The elastomeric material only acts as an elastomer. It does not have to be either electrically conductive or a good insulator.

When the sensor assembly of this invention comes in contact with a rigid body the elastomer is compressed which in turn applies a force on the silicon diaphragm incorporated in the active surface of the rigid body of the sensor die, thereby producing an electrical signal. A Force Vector 4 represents the force from the forcing body in FIG. 1. The thickness and flexibility of the elastomer is selected experimentally to optimize the spatial resolution of the sensors for each application. A thin layer of elastomer will maximize spatial resolution but will allow areas of insensitivity between the sensors. For most applications the most appropriate elastomer thickness would produce a spatial resolution approximately equal to the pressure sensor separation. Elastomer stiffness also effects spatial resolution. A high stiffness elastomer will decrease pressure sensor sensitivity and spread the applied force over more sensors. A fairly thin layer of low durometer elastomer will be most appropriate for most applications. A thin, compliant, low friction layer could cover the elastomeric layer so that the body being measured does not stick to the elastomer surface.

In the present invention the Pressure Sensors may be protected from cross-talk among the Pressure Sensors by a Rigid Barrier 6 surrounding at least one of the Pressure Sensors as shown in FIG. 1. If this feature were desired, there would typically be a barrier around each pressure sensor. The upper edge of the Rigid Barrier 6 would have to remain significantly below the surface of the elastomer so that the Rigid Barrier won't inadvertently desensitize the Pressure Sensor it surrounds.

A multiple element Pressure Sensor Apparatus architecture described thus far can be organized in a way to measure the entire area of interest simultaneously. This configuration may however yield a prohibitively expensive and, or unmanageable sensor apparatus. As an alternative, a relatively small array segment of the aforementioned Pressure Sensor Apparatus can be organized in a way such that the entire surface can be measured by moving the array segment across the surface. This patchwork like process may require that the pressure sensing apparatus and the surface being sensed be temporarily separated while moving the pressure sensing array segment to a new position along the surface being sensed. In it's limit this pressure-sensing array segment can be reduced to a level that would require only a single pressure-sensing element. A trade-off between measurement throughput time and pressure sensing hardware will regulate the segment array size. Other variations of this theme are possible including making the movement size smaller than the pitch of the sensor array sensors thus increasing spatial resolution.

Appropriate control electronics must be used to power and sense the electrical signals from the Pressure Sensors. The Pressure Sensors typically have internal elements configured as an electrical Wheatstone Bridge. This construction provides a sensitive and accurate sensor. A good choice for sampling the array of Wheatstone Bridges would be an array of Instrumentation Amplifiers, each with an enable bit. Then the outputs of the amplifier array could be combined and individually sampled by an analog-to-digital converter.

The sensors also need to be calibrated. The commercial Pressure Sensors typically have a significant offset and gain variation from one die to another. These initial parameters will probably also be changed by the application of an elastomer. The degree to which the thickness of the elastomer on each die varies can be compensated by calibration. For most applications a two-point calibration is probably fine, giving offset and scale. This calibration can probably be done in mass for a sensor array. The calibration factors for each die probably should be stored in a non-volatile memory either with the control electronics or in the computer that will process and display the final data. The present invention may also provide a means to compensate the temperature effects of the elastomeric layer covering the pressure sensors. The temperature of the substrate or pressure sensor would be sensed and appropriate sensor signal offsets and gains proportional to temperature would be applied.

One of the many possible applications for the present invention is measuring the pressure distribution when pressing two glass plates together to encapsulate an LCD or other type of optical display. Another application could be as a feedback sensor for an element of a deformable mirror for a high precision telescope. Other applications may exist in military, medical, biotechnology, or semiconductor fabrication industries for manufacturing tooling and various in situ industrial machine controls.

The scope of the invention should be determined not just with reference to the above description, but instead should be determined with reference to the appended claims along with their full scope of equivalents. For example the apparatus could be composed of one or multiple sensors. The sensors can be covered with various types of elastomer, applied in different ways. The elastomer could vary in thickness and stiffness. The sensors could be attached to various types and thickness of substrate.

We claim:

1. An apparatus for sensing the pressure produced by rigid or semi-rigid surface comprising:
   a substrate;
   one or more pressure sensors having a first surface secured to the substrate and a second surface including a sensing element; and
   at least one planar elastomeric layer having a third surface covering the second surface of the pressure sensor and a fourth surface for receiving a force resulting from said rigid or semi-rigid surface and transferring the force from the fourth surface of the elastomeric layer to the sensing element of the pressure sensor.

2. The apparatus of claim 1 wherein the one or more pressure sensors are a plurality of pressure sensors secured to the substrate each being covered by the planar elastometric layer, wherein the elastomenc layer covering the pressure sensors forms a flat upper surface to receive a force from said rigid or semi-rigid surface and transfer the force from the flat upper surface of the elastomeric layer to the plurality of pressure sensors.

3. The apparatus of claim 2 further comprising a rigid barrier surrounding at least one of the pressure sensors.

4. The apparatus of claim 1 wherein the substrate is rigid.

5. The apparatus of claim 1 wherein the substrate is an elastomer.

6. The apparatus of claim 1 wherein the substrate is a printed circuit board.

7. The apparatus of claim 1 wherein the substrate is vented or pourous and the pressure sensor is a gauge type pressure sensor.

8. The apparatus of claim 1 wherein the pressure sensor includes a Wheatstone Bridge.

9. A apparatus of claim 1 wherein the pressure sensor is a silicon micro-machined die embedded in the elastomer.

10. The apparatus of claim 1 further comprising a low friction layer covering the elastomeric layer, wherein said rigid or semi-rigid surface comes into contact with the low friction layer and a force is transferred through the low friction layer and the elastomeric layer to the sensing element of the pressure sensor.

11. A method of manufacturing an apparatus for sensing the pressure produced by a rigid or semi-rigid surface comprising:
    securing a first portion of one or more pressure sensors to a substrate, each pressure sensor including an upper surface having a sensing element; and
    covering the upper surface of each pressure sensor with an elastomeric layer so that a force applied to the elastomeric layer by said rigid or semi-rigid surface is transferred through the elastomeric layer to the sensing element of each pressure sensor.

12. The method of claim 11 further comprising calibrating the apparatus for thickness variations in the elastomeric layer.

13. The method of claim 11 further comprising sensing the temperature of the substrate or pressure sensor and calibrating the apparatus for temperature variations.

14. A method of measuring the pressure exerted by a rigid or semi-rigid surface comprising:
    transferring a force exerted by said rigid or semi-rigid surface through a planar elastomeric layer to a sensing element on an upper surface of one or more pressure sensors that are covered by the planar elastomeric layer; and
    producing an electric signal corresponding to the force transferred to the sensing element.

15. The method of claim 14 wherein the electric signal is calibrated to compensate for variations in temperature or variations in thickness of the planar elastomeric layer.

16. The method of claim 14 further comprising processing one or more electric signals with one or more amplifiers, and sampling the electric signals with one or more analog-to-digital converters.

17. The method of claim 14 further comprising organizing the one or more pressure sensors in an array segment, wherein forces exerted by said rigid or semi-rigid surface are measured by moving the array segment across said rigid or semi-rigid surface.

18. An apparatus for sensing the pressure produced by a rigid or semi-rigid surface comprising:
    a pressure sensor having a bottom surface and top surface, the top surface including a sensing element;
    means for supporting the pressure sensor secured to the bottom surface; and
    means for receiving said rigid or semi-rigid surface and transferring a force to the sensing element of the pleasure sensor while an applied force resulting from the rigid or semi-rigid surface is spread out over an area at least as large as the top surface of the pressure sensor.

19. The apparatus of claim 18 wherein the pressure sensor is a silicon micro-machined die.

20. The apparatus of claim 18 wherein the pressure sensor includes a Wheatstone Bridge.

* * * * *